United States Patent [19]
McDysan et al.

[11] Patent Number: 5,224,108
[45] Date of Patent: Jun. 29, 1993

[54] METHOD AND APPARATUS FOR CALL CONTROL SIGNALING

[76] Inventors: David E. McDysan, 207 Bridge Canyon Ct., Richardson, Tex. 75080; Edvin V. Farinholt, R.R. 4, Box 152A, McKinney, Tex. 75070

[21] Appl. No.: 885,006

[22] Filed: May 19, 1992

Related U.S. Application Data

[63] Continuation of Ser. No. 645,904, Jan. 23, 1991, abandoned.

[51] Int. Cl.5 .............................. H04J 3/12
[52] U.S. Cl. .................... 370/110.1; 370/58.2
[58] Field of Search ............ 370/58.1, 58.2, 58.3, 370/110.1, 110.4, 111

[56] References Cited

U.S. PATENT DOCUMENTS

| | | | |
|---|---|---|---|
| 4,039,757 | 8/1977 | Frisone | 370/82 |
| 4,322,843 | 3/1982 | Beuscher et al. | 370/60 |
| 4,366,478 | 12/1982 | Masuda et al. | 370/82 |
| 4,517,669 | 5/1985 | Freeburg et al. | 370/82 |
| 4,536,872 | 8/1985 | Lahti | 370/82 |
| 4,813,040 | 3/1989 | Futato | 370/110.1 |
| 4,876,035 | 10/1989 | Siwiak et al. | 370/76 |
| 4,928,276 | 5/1990 | Blondeau, Jr. et al. | 370/110.1 |
| 4,953,195 | 8/1990 | Ikemori | 370/110.1 |
| 5,051,988 | 9/1991 | Kawahigashi et al. | 370/110.1 |
| 5,144,625 | 9/1992 | Cain et al. | 370/110.1 |

*Primary Examiner*—Douglas W. Olms
*Assistant Examiner*—Melvin Marcelo
*Attorney, Agent, or Firm*—Ormand R. Austin

[57] ABSTRACT

To perform call control signaling between a user and a telecommunications switching network (and end-to-end between users), a portion of the multiplex overhead of a multiplexed data stream is formatted so that it includes the call control signaling. This in-band signaling is actually in the multiplex overhead and not in the user data as in standard multiplex formats. At nodes of the network and at user devices connected to the network, the call control signaling is extracted from the overall data stream and is processed to selectively generate new and responsive call control signaling for completing the signaling operations. The invention is useful over the entire multiplex hierarchy.

24 Claims, 9 Drawing Sheets

DS1 ESF FRAME STRUCTURE

METHOD AND APPARATUS FOR CALL CONTROL SIGNALING

This is a continuation of copending application Ser. No. 07/645,904 filed on Jan. 23, 1991, now abandoned.

FIELD OF THE INVENTION

This invention relates generally to the field of telecommunications and in particular to methods and apparatus for communicating call control signaling within and to a telecommunications network and between users of such a network.

BACKGROUND

Signaling within a telecommunications network is a fundamental operation and diverse techniques have been developed over time to facilitate use of its various forms. Generally, the term "signaling" denotes the use of call control signals to establish an end-to-end connection through a telecommunications network and to provide for disconnection once a call is complete. In the field of telephony, call control signals provide for either supervision, addressing, or call progress. For example, supervisory call control signals include those indicative of the busy or idle status of a circuit (e.g., on or off hook), addressing signals include those indicative of the station being called (e.g., the called station's telephone number), and call progress signals include those for the establishment of connections through the network (e.g., the ringing signal).

With the increasing use of digital techniques, and with growing demands for higher speeds (e.g., broader bandwidth) and more diversity in the equipment between which communications might be established (e.g., computers, facsimile machines, local area networks), a corresponding need has developed for improvements in call control signaling. It has become particularly desirable to conduct call control signaling with (and within) a switched telecommunications network so that a user can dial up wideband data transport on demand. Such dial-up capabilities have heretofore generally been unavailable.

While various techniques have evolved to advance the signaling art no single technique has been entirely satisfactory for all applications. Basically there are two types of signaling: in-band and out-of-band. With in-band digital signaling, for example, as has been used in telephone systems, certain of the quantizing data bits are robbed from the user data stream for use in conveying signaling information. This results in a loss of signal integrity or resolution since data bits otherwise available for user information are "robbed" for signaling.

Another, relatively recent technique, and generally an advance over the presently available in-band methods, is that of common channel signaling. With this out-of-band method the signals are exchanged between switching system processors over a dedicated network rather than over the data transmission path. Although there is an improvement in signaling speed, and flexibility is gained without quantization loss, there is a necessity for physically separate, dedicated links (aside from the main circuit path) and for data base processing at each end of a link.

Thus, a need persists for simple, low cost, in-band call control signaling methods and apparatus which are operative at the higher digital speeds, which are compatible with the existing digital multiplex hierarchy, and which remain operatively transparent to call control signals formatted and intended for use with certain prior call control signaling techniques and equipment.

Accordingly, it is among the objects of the present invention to provide a simple, in-band call control signaling method and apparatus which meets the above-described needs, which will be operative with dial-up on demand data transport services, and which, without loss of quantization, avoids reliance on separate signaling lines, circuits, and associated data processors.

SUMMARY OF THE INVENTION

These and other objects are attained by making unique use of the "multiplex overhead" contained in all standard multiplexed communications signals. As is well known to those of skill int he art, and as will be briefly outlined hereinbelow, the preferred, and virtually universal, method for digital communications is time division multiplexing. Certain portions of the standard multiplexed data streams are reserved or structured as "overhead"; i.e., for such uses as timing, synchronization, and error detection. A portion of the multiplex overhead is also set aside for proprietary usage or as a terminal-to-terminal data link.

In one aspect of the present invention, to perform call control signaling between a user and a switching network (and end-to-end, between users), a portion of the multiplex overhead of a data stream is formatted so that it includes data identifiable as the call control signaling. This in-band signaling is actually in the multiplex overhead and not in the user data as in the standard multiplex formats. In connection with call routing (i.e., switching) and at devices connected to the network, the call control signaling is extracted from this overall data stream (containing user information and perhaps other portions of the multiplex overhead) and processed to selectively generate new and responsive call control signaling. The new call control signaling is selectively directed to a multiplexed stream (which may be a multiplexed stream other than the one from which the call control signaling was first extracted) and the multiplex overhead of that data stream is overwritten with the new call control signaling. Thus, the call control signaling is associatively conveyed through the network (and between the network and user devices) with the user data (they are in the same multiplexed signal), but the call control signaling and user data are processed and directed separately.

In a preferred embodiment, the user data and signaling information are multiplexed within the same composite data stream such that the call control signaling is formatted as part of the multiplex overhead, and in particular by making use of the terminal-to-terminal data link portion of the overhead (i.e., the "signaling overhead") so as not to disrupt the timing, synchronization, and error checking functions. At one or more switching nodes within the network this composite multiplexed data stream enters one of a plurality of ports (e.g., a port card).

The port card includes a demultiplexer which is operative to separate the signaling overhead from the user data and the remaining portions of the overhead, thus providing two physically separate digital streams (i.e., the "signaling overhead" and the "user data stream'"—the latter also including the standard time division multiplexing, or TDM overhead). It may be mentioned at this point that the port card also includes a multiplexer which ultimately recombines the two streams back into one composite stream for routing by the programmable switch which is part of the node.

An incoming signal processor continuously monitors the separated signaling overhead stream for signaling messages. When a valid, appropriately addressed, message is received in the signaling overhead it is sent to a control processor, commonly shared with other port cards via a local area network (or via a common bus). Any standard control signals not included in the signaling overhead, but included in the multiplexed stream in accordance with standard methods, are detected in the other separated data stream by a signal detector, from which they also are directed to the control processor.

The control processor includes a call processing function which is operative to selectively create new and responsive call control signaling and to provide readdressing for it and the standard control signals not included in the signaling overhead. The call control signaling and the standard control signals from the control processor are directed, by appropriate addressing (assigned by the processor), to an outgoing signal processor associated with an output stream from the programmable switch. The output stream (which is a composite multiplexed stream) to which the new call control signaling is directed may be in the same or in a different port card.

Overwrite or merge switches (one in each separated stream) are used to insert the new and readdressed call control signaling and the standard signaling into the signaling overhead and the user data streams, respectively. Following that operation, the two streams are again multiplexed into a single composite data stream which is transmitted to the next switching node or to user receiving equipment. By these means and techniques call control signaling is conveyed between the network and user devices and end-to-end through the network between users.

While the principal focus of the present invention is with call control signaling, any standard messages otherwise contained in the signaling overhead (e.g., PRM messages per ANSI T1.403 as will be discussed herein) may also be processed in accordance with the invention although their handling by prior art methods is not precluded.

Advantageously, the invention provides a simple, in-band method and apparatus for establishing end-to-end connections and is useful over the entire digital multiplex hierarchy, from the standard DS1 data stream at an overall circuit rate of 1.544 megabits per second up to the Synchronous Optical Network (SONET) rates which are in multiplex of 51.84 megabits per second.

BRIEF DESCRIPTION OF THE DRAWINGS

The various objects, advantages and novel features of the invention will be more readily apparent from the following detailed description when read in connection with the appended drawings, in which:

FIG. 8 is an illustration of how messages are preferably formatted for transmission on the bus or LAN which interconnects certain components of the preferred apparatus of FIG. 7;

DETAILED DESCRIPTION OF THE INVENTION

Although the standard digital multiplex hierarchies and multiplex formats used in telecommunications are well known, Table 1, following, sets out an example of certain specific multiplexing levels and the overall circuit and constituent data rates of those levels, and may be helpful in developing an understanding of the invention. The invention makes use of the multiplex overhead, a constituent of the overall circuit rate, to perform call control signaling.

TABLE 1

| Multiplex Level | Overall Rate | User Data Rate | TDM Overhead | Signaling Overhead |
|---|---|---|---|---|
| DS1 ESF Data Link DL | 1.544 Mb/s | 1.536 Mb/s | 4 Kb/s | 4 Kb/s |
| DS3 C-bit | 44.736 Mb/s | 44.2097 Mb/s | 498.1 Kb/s | kx9.398 Kb/s |
| SONET mx VT1.5 Path Overhead Byte | mx1.728 Mb/s | mx1.536 Mb/s | mx128 Kb/s | mx64 Kb/s |
| SONET STS -nc Path Overhead Byte | nx51.84 Mb/s | nx49.536 Mb/s | nx2.24 Mb/s | nx64 Kb/s |

In Table 1, DS1 and DS3 refer to industry standard, well defined Digital Streams 1 and 3; SONET refers to the emerging Synchronous Optical Network technology. From the Table it will be noted that each overall circuit rate is subdivided into data streams for user data, time division multiplexing (TDM) overhead, and a reserved overhead portion for proprietary usage as a facilities or terminal-to-terminal data link (FDL). The latter data stream is referred to in Table 1 as the "signaling overhead" rate. The bit formats and bit assignments for the various data streams are specifically defined in the following American National Standards Institute (ANSI) documents, incorporated herein by reference;

T1.403-1989—DS1 Customer/Network Metallic Interface

T1.404-1989—DS3 Customer/Network Metallic Interface

T1.107-1988—Digital Hierarchy Formats Specification

T1.105—SONET Optical Interface Rates and Formats

Figure 1:
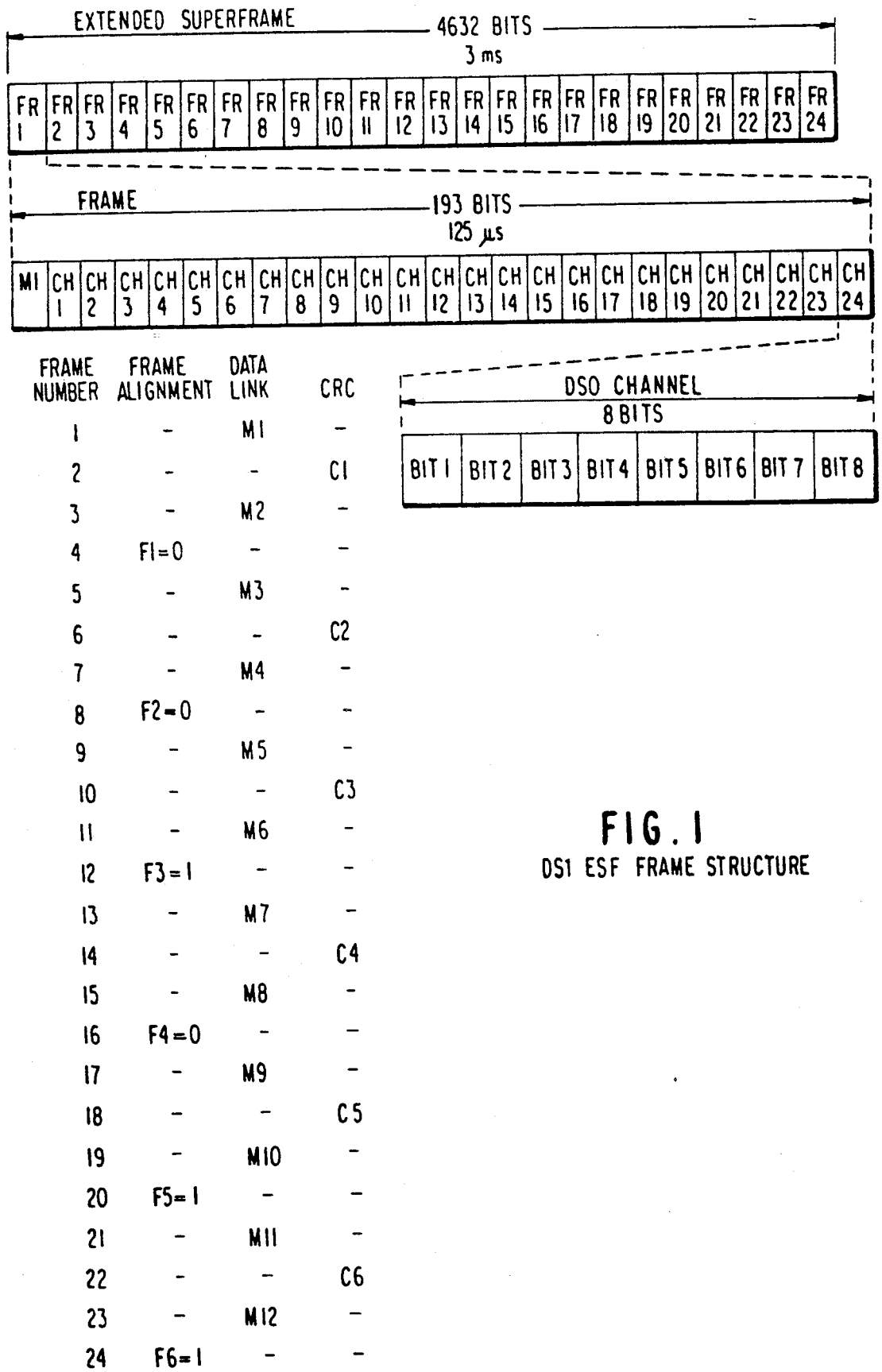
FIG. 1 is an illustration of the make-up and frame structure for a standard DS1 division multiplexed stream in an extended super frame (ESF) format.

The structure of one of the standard data streams (DS1 in an extended superframe format—ESF) is further illustrated in FIG. 1. For this format there are 24 frames within an extended superframe, each frame of which is subdivided into 24 channels. Each channel then contains eight individual bits which comprise a byte of data to quantify the information being carried int hat channel. In addition, each frame includes an added bit which is for multiplex overhead (e.g., synchronization) purposes. The added bit is typically referred to as an F bit and it occurs, overall, at an 8 kilobit/sec. rate. Of this, 4 kb/s are used for frame alignment and as a check code (CRC) (i.e., the TDM overhead rate of Table 1). The remaining 4 kb/s are for facilities data linking (i.e., the signaling overhead rate of Table 1) and are indicated in FIG. 1 as the M bits. The standard use of the signaling overhead (ANSI Standard T1.403) is to provide a once per second broadcast performance report message (PRM). The present invention appropriates the M bit positions and writes messages into the M bit stream for conveying the call control signaling.

Figure 2:
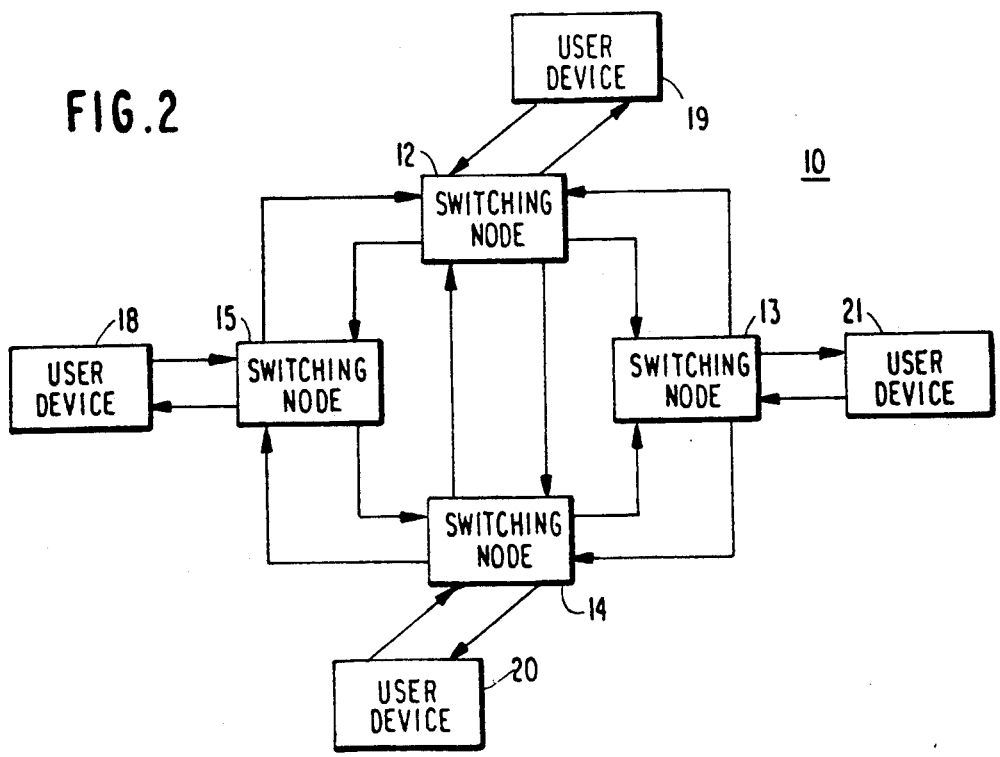
FIG. 2 is a schematic diagram of a telecommunications network wherein, and in connection with which, the invention would be useful.

To put the invention in an operative context, FIG. 2 shows one form of a digital telecommunications network, such as network 10, wherein, and in connection with which, the invention is useful. The network 10 is illustrated in simplified form for purposes of explanation, but it may in fact be geographically extensive with the various switching nodes 12–15 separated by considerable distances. The network 10 may, for example, be nationwide, involving any number of switching nodes.

Generally, connected to each switching node of the network 10, are a plurality of suer devices 19–21. Each of the user devices 18–21 includes an appropriate interface to facilitate an exchange of signals with the switching node to which is connected. A user device may provide virtually any functionality to the user and may comprise computers, work stations, video cameras and displays, or other similar devices. The idea, of course, is to establish end-to-end communications between two or more of the user devices via a network of switches in response to signaling messages generated by and received from the user devices. The switching nodes are interconnected so that routing through the network 10, as from user device 18 to user device 21, might be via any of a variety of available paths.

Figure 3:
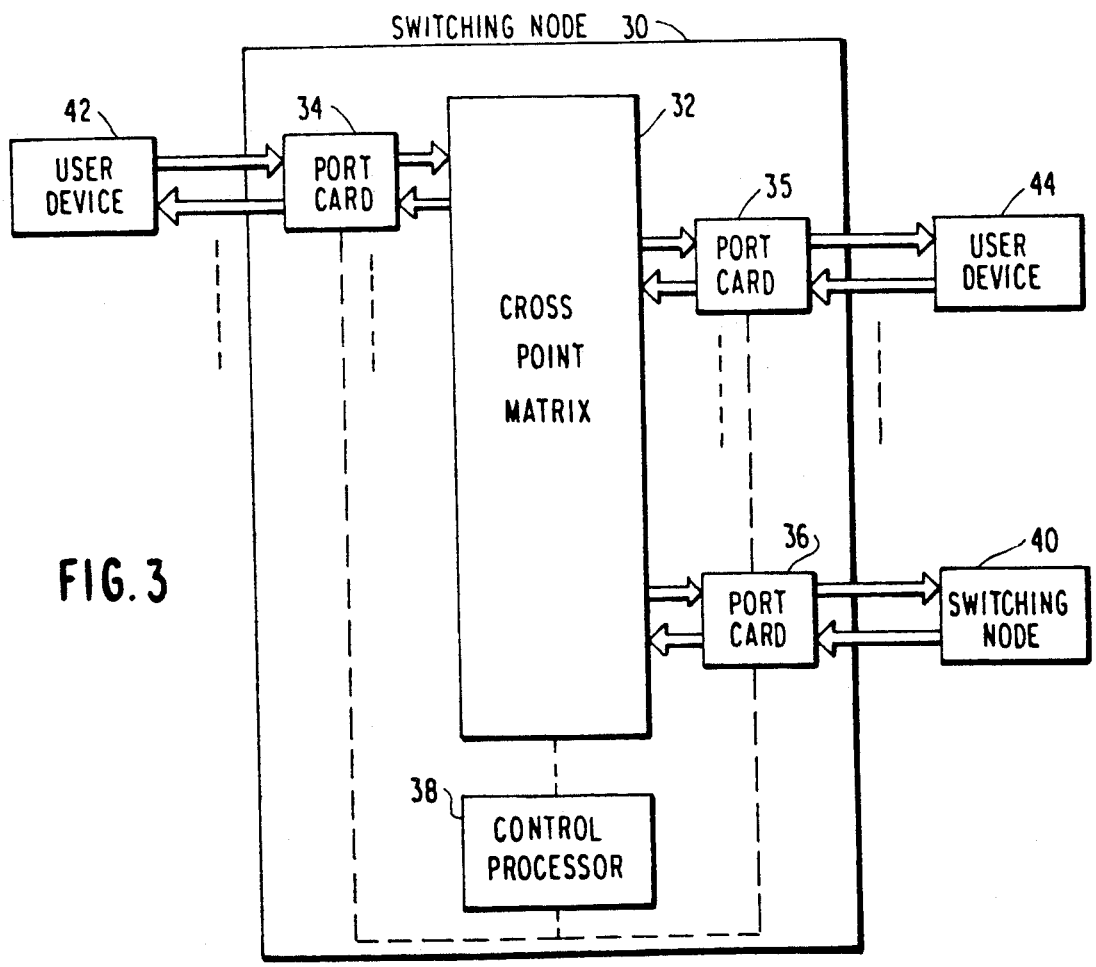
FIG. 3 is a schematic illustration of a switching node having port cards, an attached processor, and a cross point matrix, all as might be configured for practice of the invention.

FIG. 3 shows, in somewhat more detail, a switching node 30 which is essentially identical to each of nodes 12–15 of FIG. 2. Switching node 30 includes a cross-point matrix 32 having connected to it a plurality of port cards, such as port cards 34–36. A control processor 38 is also preferably part of the switching node 30 and operates to exert coordinated control over the cross-point matrix 32 and the port cards 34–36. A single control processor, as control processor 38, may in fact control several remotely located cross-point matrices, each having a plurality of port cards connected to it.

The switching node 30 may be connected to other switching nodes, as to switching node 40, and to user devices, as to user devices 42 and 44. Each user device is connected into the switching node for both sending and receiving communications through a dedicated one of the port cards. The cross-point matrix 32 operates under the direction of the control processor 38 to put up and take down connections between port cards, such as, for example, between port card 34 and 35. The cross-connect matrix 32 may in fact be directed to return the output of a port card back to the input of that same port card.

End-to-end duplex connections might be established, for example, in FIG. 3 between user device 42 and user device 44 via port card 34, cross-point matrix 32, and port card 35. In accordance with the invention, the call control signaling conveyed between and among user devices, port cards, and other components of the network (e.g., network 10 of FIG. 2) is contained in the multiplex signaling overhead. IF, for example, the multiplexed signal is int he form of a DS1-ESF multiplex stream the signaling information would be contained in the bit stream which makes up the signaling overhead (the M bits of FIG. 1). This signaling is preferably structured in messages formatted in accordance with ISDN LAP-D (link access procedure) as specified in ANSI standard T1.602-1989 and in the CCITT recommendations Q.921 and Q.931, each of which is incorporated herein by reference. It will be understood, however, that while such message formats are preferred, other formats may be used within the scope of the invention.

Figure 4:
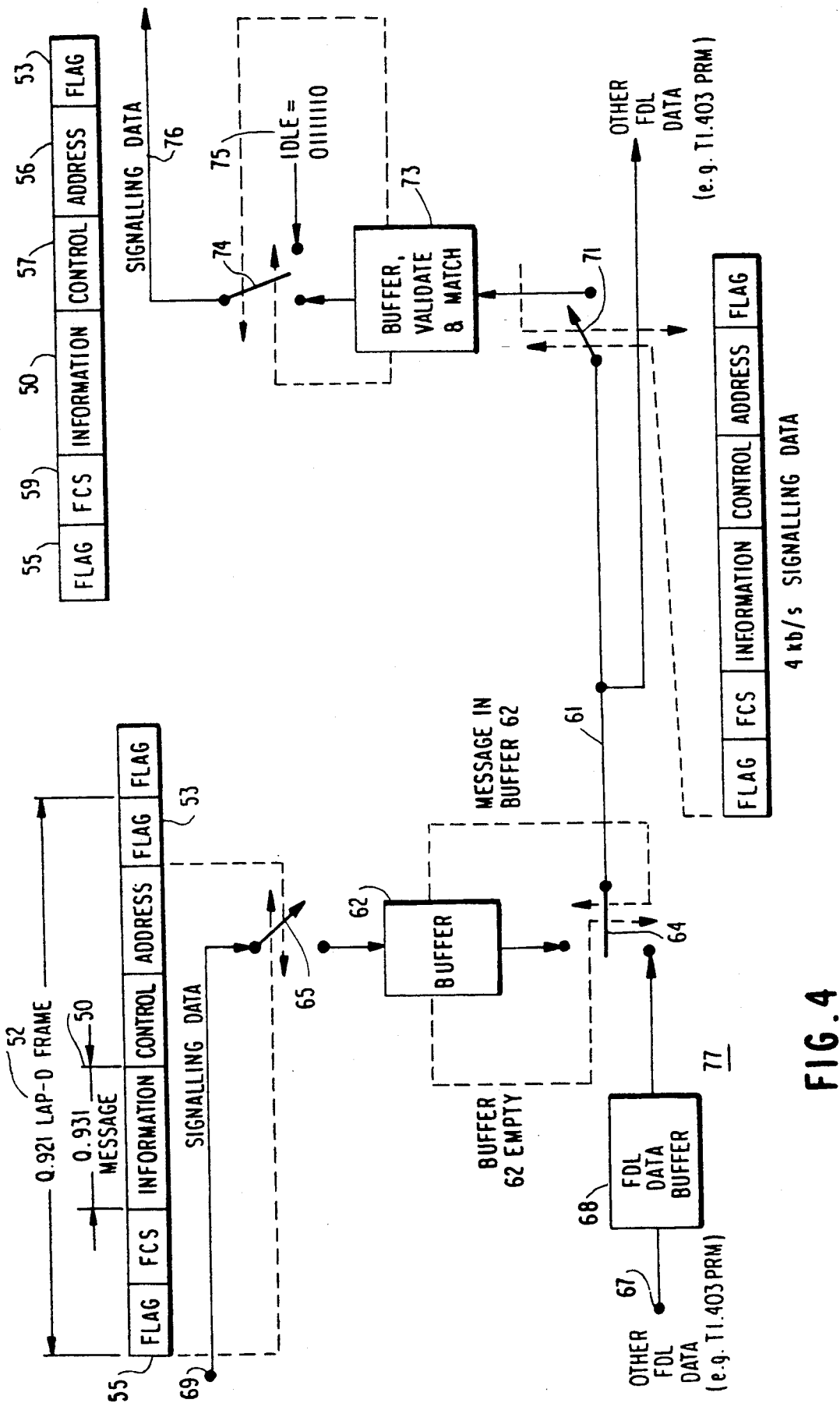
FIG. 4 is a schematic illustration of a multiplex overhead overwrite and extraction process in accordance with the invention and is provided for conceptual purposes.

FIG. 4, illustrated in terms of DS1-ESF multiplexed data stream, is helpful for developing an understanding of the invention. FIG. 4 also shows one way in which the signaling messages may be structured. For example, a Q.931 signaling message 50 is shown enveloped by a Q.921 frame 52, wherein Q.931 and Q.921 refer to standards of the International Consultative Committee for Telegraphy and Telephony (CCITT). The message frame 52 always begins with a flag 53 and ends with a flag 55, reading, in this case, from right to left in the message. The next sequence of bits following the flag is an address 56 (which might, for example, be the address employed for user-network signaling). The control field 57 of the message is used to identify the type of frame; i.e., whether it is an information or supervisory command or response. The next field 50 of the frame 52 contains the call control signaling information which is being conveyed and which is of importance in the present context. This might, for example, be a Q.931 message containing the address of the calling party. This field is followed by a frame check sequence (FSC) field 59 and the trailing flag 55.

From an operative view, there is a 4 kb/s DS1-ESF data stream available within the overall multiplex stream, which data stream is appropriated for call control messages. In FIG. 4 this is by access to line 61. Normal access on the transmit side (consisting essentially of buffer 62, switches 64 and 65, and data buffer 68) is through switch 64 (in the position shown) so that line 61 is connected to a standard source of FDL data (e.g., performance report messages or PRMs, as mentioned above) at input point 67. Call control signaling messages as described above are input to a second point 69 from which they may pass via switch 65 to message buffer 62. With receipt of a signaling message at point 69 and upon detection of a flag-to-address transition within the message, the address and remaining portions of the message are entered into and held in the message buffer 62. Once an entire message is present in the buffer 62, the input switch 65 is opened, switch 64 is caused to change its position, and the message contained in buffer 62 is put out on to line 61 in place of the normal FDL data, or signaling overhead.

To avoid loss of the FDL data, however, input line 67 also preferably includes a data buffer 68 to temporarily hold the FDL data. By this means, buffer 68 holds the FDL data, and switch 64 changes positions only after the FDL data transmission is complete; i.e., when buffer 68 is empty and buffer 62 contains a signaling message. In any case, the effect is that normal FDL data is either overwritten by the call control signaling message (i.e., it has higher priority) or it is merged with the FDL data. The FDL data buffer 68, along with switch 64, essentially comprise an overwrite/merge switch 77. The buffer 62 is flushed with each overwrite or merge, and when empty, switch 64 is repositioned for the normal flow of FDL data.

The transmit side, as just described, might be operative within a user device or within a network node.

On the receive side (consisting essentially of switch 71, buffer 73, and switch 74), switch 71 closes on a flag-to-address transition of an appropriately framed message appearing on line 61. The message from line 61 is then stored in buffer 73 and switch 71 then reopens. With an entire frame buffered, the received frame is subjected to a frame check sequence (FCS) validity check. If the received Q.921 frame is valid, and if there is an address match, it is passed through switch 74 to an output line 76 for processing (as a response or command) at the network node or with the user device of which the receive side is a part. With no message frame in the buffer 73, switch 71 is open and switch 74 connects the output line 76 to a signal source 75 to indicate an idle status.

Figure 5:
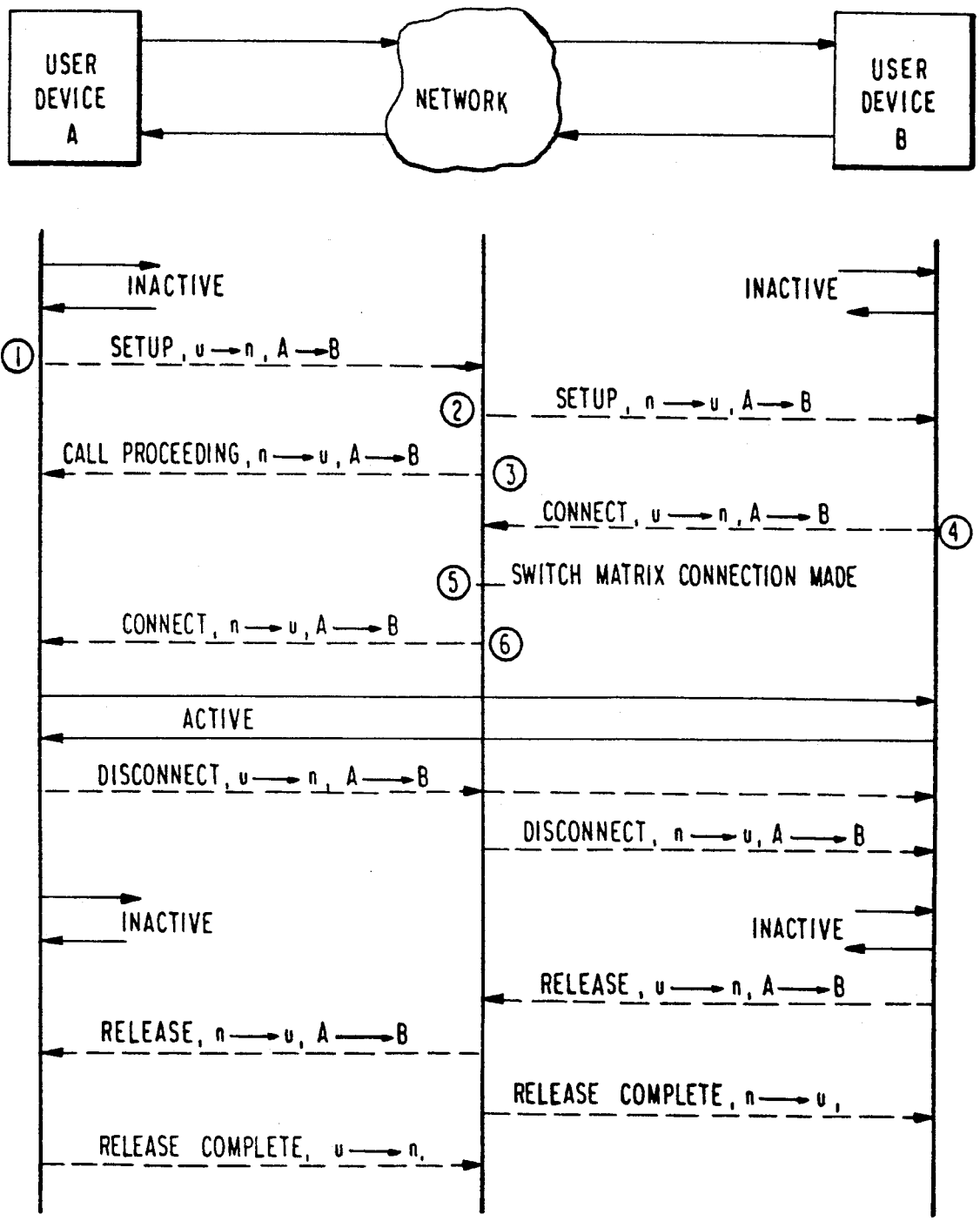
FIG. 5 is a space-time diagram illustrating a simplified example of call control signaling between users.

FIG. 5 is a space-time diagram to illustrate, in a somewhat simplified example, the propagation of call control signals for (i) circuit connect, (ii) digital data transfer, and (iii) circuit disconnect. The vertical dimension of FIG. 5 represents the progression of time, from top to bottom, and diagrams the action of each component depicted at the top.

Initially, user device A and user device B are both "inactive." User device A initiates a call by issuing a circuit request in the form of a "setup" message somewhat analogous to a "dialing sequence" in telephony. This initial setup message is addressed from user device A to the network (Step 1, u to n, in FIG. 5). From the network another setup message then is passed (Step 2, n to u) to user device B alerting user device B that user device A is calling. The network then signals user device A with a message that the call is proceeding (Step 3). If user device B is available to respond to the call, it issues a "connect" message to confirm connection (Step 4).

At this point (Step 5) connections are established through the network (e.g., through the switching node 30 of FIG. 3). The network confirms connection (Step 6) with a "connect" message to user device A. The connection is then "active" and communications may ensue between users via the network path established.

At the completion of the "active" stage, either end may initiate disconnection, although in FIG. 5 the disconnect signal is illustrated to originate with user device A. Because the entire multiplexed stream is switched through the network, once connection is made, the signaling messages are received at the destination user device as well as at the network. Discrimination is made on the basis of the address contained in the message (either u to n or n to u). User device B ignores the "disconnect" message addressed from u to n. The network issued "disconnect" message is addressed to the user device (i.e., n to u) and is processed by user device B. Once the network path ceases to be "active", "disconnect" and "release" messages are exchanged between the network and each user device to confirm release completion. These steps, shown in FIG. 5, are not numbered therein.

From an operational point of view, in this example, the received call control signaling is extracted and processed at each node of the network and at each user device to complete the signaling between various nodes of the network and between users of the network. The processing is done by extracting the overhead, performing the processing, and inserting the new call control signaling (one of the response messages of FIG. 5) into the overhead of the appropriate stream. It should be noted, however, that the invention is useful for less than end-to-end and at each node. It may, for example, be used only between a user and a network node or in less than the entire network.

Figure 6:
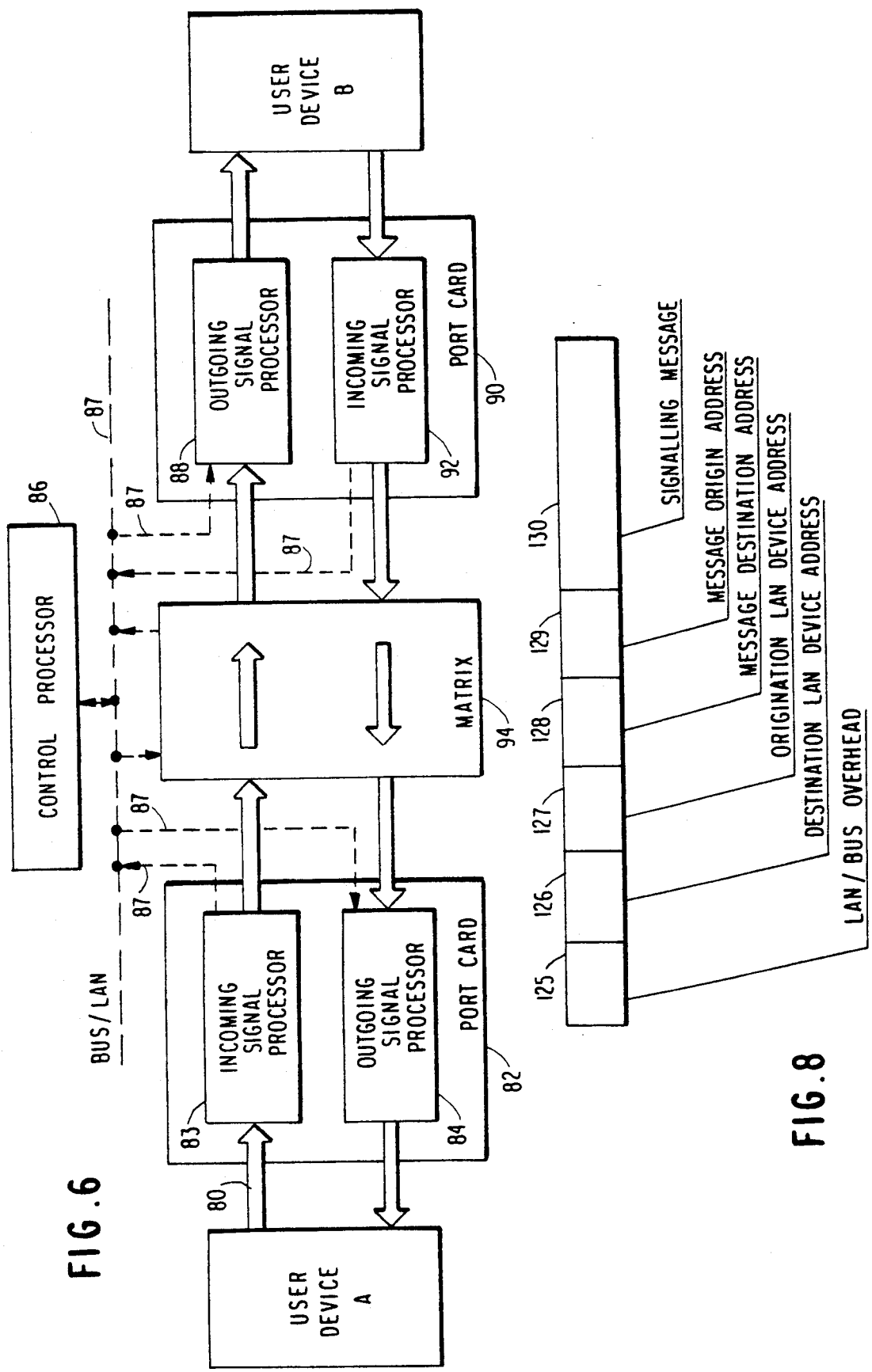
FIG. 6 illustrates, along with FIG. 5, one example of call control signal flows to and through a network in accordance with the invention.

FIG. 6 can be referred to in connection with FIG. 5 for following one example of the physical flow of call control signaling to and through a network. The Step 1 "setup" message, generated in user device A, is transmitted to the network in the overall multiplexed signal via an interconnecting link 80. The port card 82 which receives this signal (at a node of the network) includes an incoming signal processor 83 and an outgoing signal processor 84. The signaling overhead, containing the setup message, is extracted from the overall stream by the incoming signaling processor 83. If the setup message is validly addressed and properly framed within the extracted signaling overhead, that message is forwarded to the control processor 86 (for this particular node of the network) via the control bus 87. Thus, Step 1 is complete with the transmission of the initial setup message from user device A to the control processor 86.

In Step 2 the control processor 86 responds to the received message by generating and sending a new "setup" message via control bus 87 to the outgoing signal processor 88 of port card 90. Within the outgoing signal processor 88, the signaling overhead (FDL) stream of the overall data stream to user device B is either overwritten or merged into so that the message is thus conveyed to that user device. This completes Step 2.

The "call proceeding" message (Step 3) also originates in the control processor 86 and is forwarded to user device A by way of the control bus 87 and the outgoing signal processor 84 of port card 82. In the outgoing signal processor 84 the signaling message is either overwritten or merged into the signaling overhead portion of the overall multiplexed stream passing to user device A, either preempting whatever might otherwise be there or merging with it.

Similar message flows occur for Steps 4 and 6. In Step 4 the "connect" message originates in user device B. That message is extracted from the suer device B multiplex stream by incoming signal processor 92 of port card 90 and it is forwarded to the control processor 86 via the control bus 87. The Step 6 message confirming connection originates in the control processor 86 and ends at user device A. The Step 5 message is from the control processor 86 to the switching matrix 94 and provides the command for establishing cross-connections through the matrix 94 between the appropriate port cards (in this illustration between port cards 82 and 90).

Following the "active" period the "disconnect" message is passed transparently through port cards 82 and 90 to user device B through matrix 94. Incoming signal processor 83, however, extracts the disconnect message and forwards it to control processor 86 via control bus 87. User device B ignores this message because it is not addressed to it. The control processor 86 breaks the connection through the matrix 94 between port cards 82 and 90 and issues a "disconnect" message to user device B through port card 90. In FIG. 6 the full multiplex streams are shown as arrowed double lines generally end-to-end; the extracted signaling within the network node is generally on the dashed line indicative of bus 87.

While the foregoing provides a conceptual description of the invention, FIGS. 7-11 may be referred to for further details of a preferred embodiment.

Figure 7:
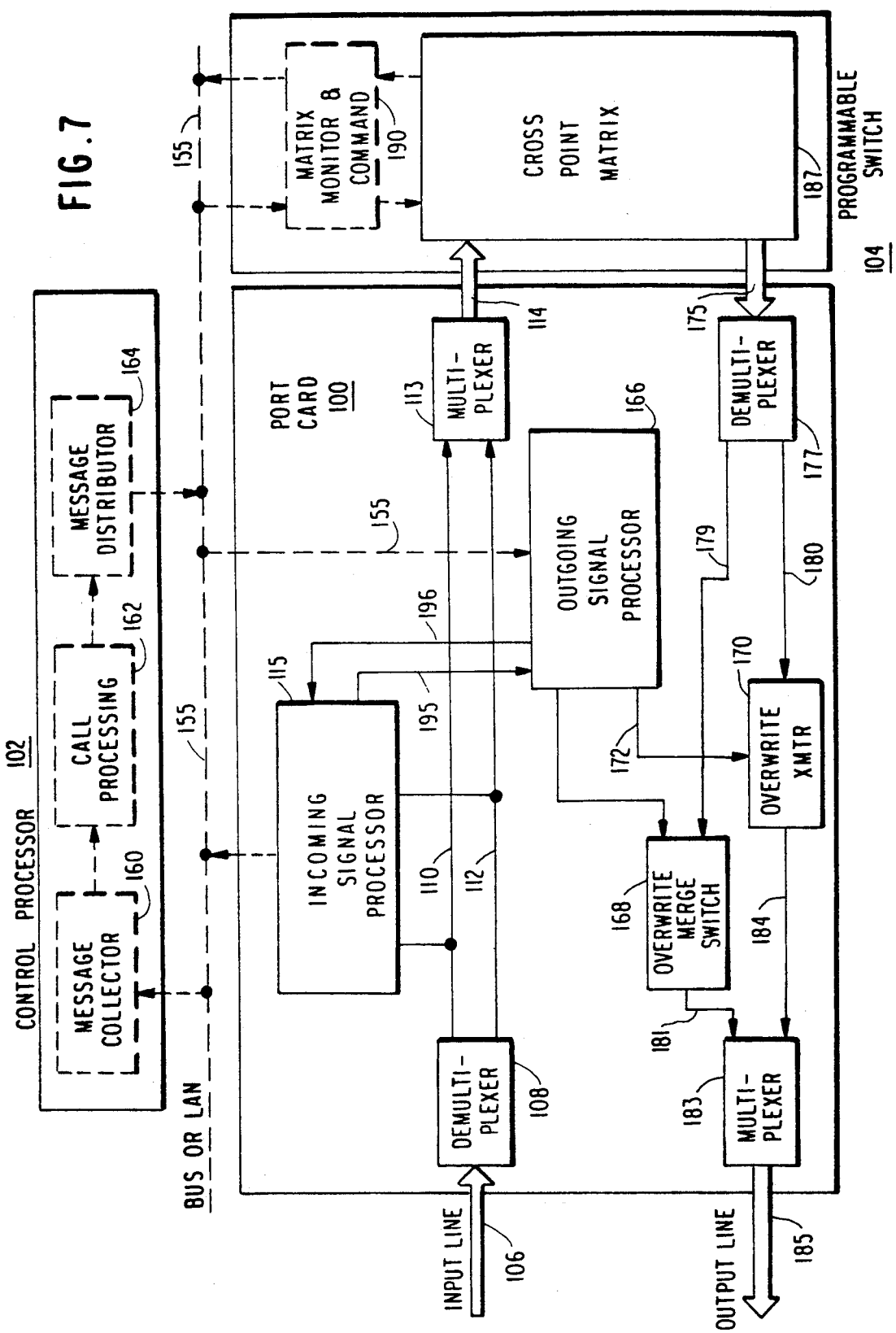
FIG. 7 is a block diagram of a port card in accordance with a preferred embodiment of the invention, as might be used in the apparatus of FIGS. 2 and 3, and illustrative of operation in connection with an attached processor and a programmable switch.

FIG. 7 shows a switching node having a port card 100 (which may be one of a plurality used in the node), a control processor 102, and a programmable switch 104, all of which are interconnected by a bus or local area network (LAN) 105. In operation, a composite multiplexed data stream (e.g., a DS1 ESF stream) is received at the port card 100 on input line 106. The input line 106 might be from a user device, from another switching node, or from a cross-point matrix which is part of the same node as is port card 100. In any case, the input data stream on line 106 passes to a demultiplexer 108 which demultiplexes the composite stream into two streams, one of which is the signaling overhead (i.e., the FDL stream) appearing on line 110, and the other of which is the user data and the TDM overhead, appearing on line 112. For reasons that will become apparent, these two streams are applied to multiplexer 113 of the port card 100 where they are immediately remultiplexed into a composite stream and passed, on output line 114, to the programmable switch 104 for network switching purposes. Thus, between nodes of the network and through the network switches, the call control signaling and the user data are associated in the same stream. At the nodes and within user devices connected to the network, however, the signaling is processed separately from the user data stream.

An incoming signal processor 115 continuously monitors the separated signaling overhead stream on line 110 for signaling messages formatted, for example, in the Q.921 LAP-D frame structure. When a valid signaling message is received the address field is examined. An address unique to the use of multiplex overhead signaling, and not used by any other standard, identifies the call control signaling messages. For messages that are validly addressed and properly framed, the signaling message (e.g., the Q.931 message) is extracted by the incoming signal processor 115. That message is then reformatted for communication to the control processor 102 via the control bus 155.

It should be noted that standard addressed messages (e.g., as per ANSI T1.403-1989 for a DS1 ESF data stream—which are not contained in the signaling overhead) are not acted upon by the signaling overhead processor 65 and these messages pass transparently through the port card 100. Indeed, the invention preserves end-to-end transfer of any other messages between user terminals during the active interval; i.e., after the connection is setup until it is disconnected.

The incoming signal processor 115 also monitors the separated user stream and the standard TDM overhead that appears on line 112 from demultiplexer 108. The incoming signal processor 115 thus also monitors for standard TDM signaling such as standardized idle, alarm indication signals (AIS), and loss of signal (LOS). These change of state signals do not normally appear in the signaling overhead on line 110 but would be contained in the data stream in accordance with well known standards. In one aspect, therefore, the present invention provides for the handling of these signals. In this case, the incoming signal processor is operative to also reformat these change of state signals and to forward them to the control processor 102.

The message exchanged and conveyed among components on LAN of control bus 155 are preferably structured and formatted as shown in FIG. 8. These messages include six fields, the first of which, field 125, provides overhead for the LAN 155. The next four fields, 126-129, are for addressing and include address fields for the destination device on LAN 155, the origination device on the LAN, the signaling message destination, and the message origin address, respectively. The latter two addresses define the location of messages, or functions, within the control processor 102. Only those messages for call processing are of concern here. A final field 130 contains the call control signaling information being either received or transmitted. The LAN 155 may in fact be implemented in accordance with any number of well known LAN standards.

The messages sent to control processor 102 are collected in message collector 160 from which they are passed to a call processing function 162 which is operative to selectively generate new call control signaling messages (i.e., as required to complete the call control signaling) and to provide readdressing of the signaling message. The procedures used in the call processing machine 162 may be either the well known standards such as ISDN from CCITT Q.931, CCITT X.21, the telephony "wink start" protocol or other proprietary procedures. The call processing function 162 may, for example, generate signaling messages for such things as call proceeding, connect, release complete, etc. as described above.

The signaling messages produced by the call processing function 162 are accepted by a message distributor 164 which functions to distribute these messages to port cards and to programmable switch 104, all connected to LAN 155. The recipient port card for any particular message need not be the port card 100 of FIG. 7, but may be any one of the plurality of such cards which are connected to the bus or LAN 155 (although only port card 100 is illustrated in FIG. 7). The recipient port card for any particular message will, of course, be the port card designated as the recipient in the message address. In the port card 100 of FIG. 7, however, as in all of the port cards connected to LAN 155, any message from the message distributor 164 destined for that card is received by an outgoing signal processor, as by outgoing signal processor 166 of FIG. 7.

The outgoing signal processor 166 operates to direct the received messages to either the overwrite/merge switch 168 or to an overwrite transmitter 170. Whether the overwrite/merge switch 168 or overwrite transmitter 170 receives the message depends on whether the call control signaling of the message is of the type for conveyance in the signaling overhead or is of the type not for conveyance in the overhead, such as the change of state signals for standardized idle, the alarm indication signal (AIS), and loss of signal (LOS). If the message contains signaling of the first type, the message is passed to overwrite/merge switch 168; if of the second type, it goes to overwrite transmitter 170. The overwrite/merge switch 168 is entirely analogous and functionally equivalent to the overwrite/merge switch 77 discussed in connection with FIG. 4. It should be pointed out, also, that the overwrite transmitter 170 is optional and that the change of state signals can be added perhaps most simply by the programmable switch 104 as is well known in the art.

The incoming signal processor 115 and the outgoing signal processor 166 are interconnected by lines 195 and 196 to facilitate changing the content of the matching address filter for the incoming LAP-D frames and for forwarding error messages back to the sender. These aspects are more fully explained hereinbelow.

Also coming into the port card 100, from the programmable switch 104, is another composite multiplexed data stream which is supplied on port card input line 175. This composite signal passes to demultiplexer 177, which, in the manner of demultiplexer 108, separates the composite stream into a signaling overhead portion, appearing on line 179, and a user data and TDM portion, appearing on line 180.

The signal overhead stream on line 179 is applied to an input of the overwrite/merge switch 168 while the user data/TDM stream on line 180 is applied similarly to overwrite transmitter 170. In operation, the overwrite/merge switch 168 takes the call control signaling messages received from outgoing signal processor 166 and writes those messages into the signaling overhead stream, effectively either overwriting or merging with whatever might otherwise be there (in either case, interjecting them into that overhead stream). By like operation, the second overwrite transmitter 170 takes the change of state messages received from the outgoing signal processor 166 and writes those messages into the user/TDM stream, overwriting whatever is there in the bit locations available for these signals.

The signal overhead stream emerging from the overwrite/merge switch 168, on line 181, and the user data/TDM stream emerging from the overwrite transmitter 170, on line 184, are applied as inputs to a multiplexer 183. Multiplexer 183 recombines these input streams into a composite multiplex stream which exits the port card on output line 185. The stream on output line 185 may be applied to another port card at a different switching node or it may be directed to a user device.

The programmable switch 104, including a crosspoint matrix 187 and a matrix monitor and command unit 190, functions in the manner of a standard digital switch or cross-connect, adapted to accept connection and disconnection messages from the message distributor 164. Response messages are sent from the matrix monitor and command unit 190 to the message collector 160 via the bus or LAN 155. The cross-point matrix 187, analagous to the cross-point matrix 32 of FIG. 3, transparently connects one port card input line and one output line to the output line and input line of another port card.

Figure 9:
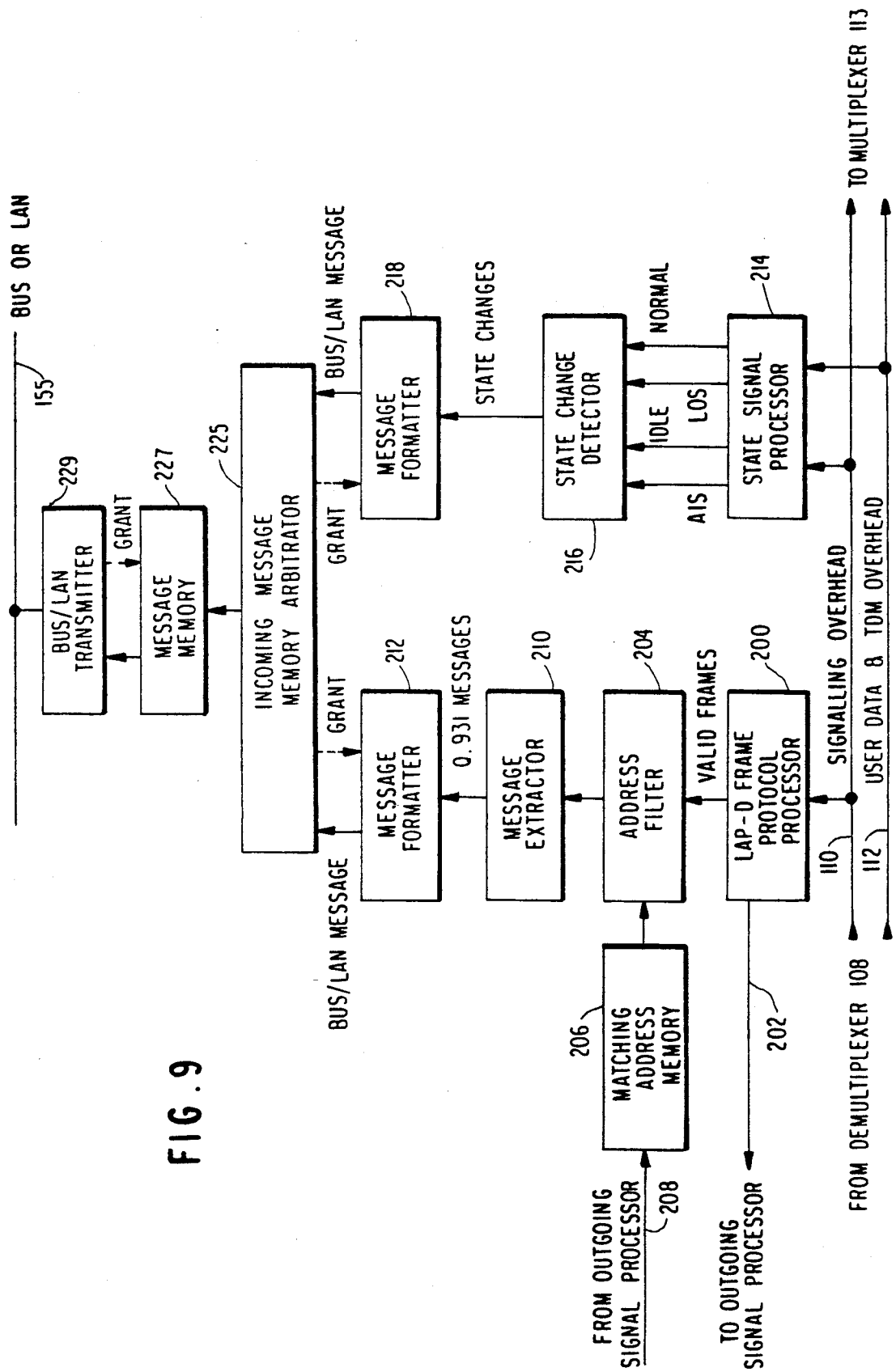
FIG. 9 is a diagram of the functional parts of the incoming signal processor of FIG. 7.

FIG. 9 illustrates the operative functions carried out in the incoming signal processor 115 of FIG. 7. The separated signaling overhead from line 110 is monitored for the occurrence of a LAP-D frame by a LAP-D frame protocol processor 200. Each such frame is checked in the LAP-D frame protocol processor 200 for errors in accordance with standard error checking procedures. Any errors are immediately flagged and an error signal is then sent by way of line 202 to the outgoing signal processor 166 from which the original sender of the message is notified of the error. Thus, errored messages are detected without burden on further processing steps.

Valid frames are forwarded from the LAP-D frame protocol processor 200 to an address filter 204 where the valid frames are checked to see if they have a matching address. The address filter 204 operates in conjunction with a matching address memory 206. The matching address memory 206 contains a stored list of allowed addresses. This memory 206 facilitates changing the allowed addresses. For that purpose line 208 is received from the outgoing signal processor so that the control processor 102 can write to the memory 206 by way of the outgoing signal processor 166.

Error-checked properly addressed frames are passed through the address filter 204 to a message extractor 210 which functions to extract the Q.931 messages. These messages, comprising the call control signaling, are then given to a message formatter 212 wherein they are structured into messages compatible with operation of the LAN 155 and control processor 102 (e.g., preferably as shown in FIG. 8).

Also included as functional parts of the incoming signal processor 115 (of FIG. 7) are state signal processor 214, state change detector 216, and message formatter 218. The state signal processor 214 monitors the demultiplexed line 112 (containing user data and standard TDM overhead) for change of sate signal such as LOS, AIS, and Idle. These signals are not call control signals but they are processed similarly by the incoming signal processor 115. Under normal conditions the state signal processor 214 puts out a binary signal on line 220 indicative of a "normal" condition. With a change of state, as indicated by bit changes in the TDM stream, the state signal processor will withdraw the normal signal and put out an AIS, Idle, or LOS signal as appropriate. The output signal, whichever it is, is put out on the appropriate line to the state change detector 216. Each state change is indicated by passage of a signal to the message formatter 218 from the state change detector 216. The formatter 218 functions as does the formatter 212 and formats the state change information into a message compatible with LAN 155.

In the event message formatters, 212 and 218, develop messages simultaneously, an incoming message arbitrator function 225 operates to select either the call control message or the change of state message, depending on the priority established. The message arbitrator 225 puts the formatted messages into a message memory 227 where they are stored, on a first-in-first-out basis, for transmittal to the control processor 102. A bus/-LAN transmitter 229 is intermediate to the LAN 155 and the message memory 227 and operates to interface the memory 227 to the LAN 155.

Figure 10:
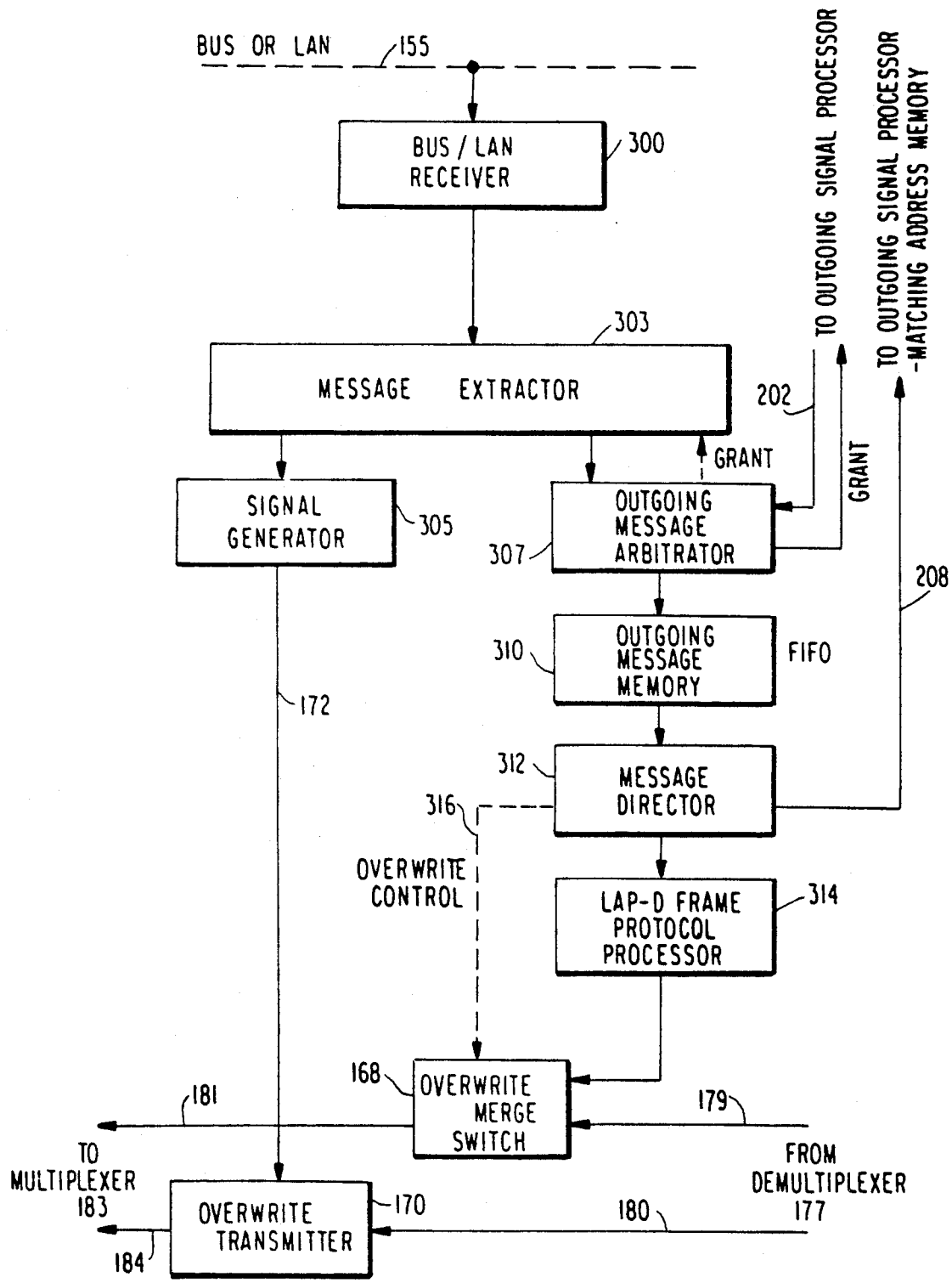
FIG. 10 is a diagram of the functional parts of the outgoing signal processor of FIG. 7.

FIG. 10 illustrates the operative functions carried out in the outgoing signal processor 166 of FIG. 7. The call control signaling and any change of state signals directed to the outgoing signal processor 166 by the control processor 102 arrive via LAN 155 in the message format described above. A bus/LAN receiver 300 serves to receive only messages with a destination LAN address for the particular port card. Properly addressed messages thus pass to a message extractor 303 which operates to remove the message from the LAN message envelope and to separate any change of state signals from the call control signaling.

Any extracted change of state signals are passed to a signal generator 305 which re-creates the change of state signals, putting them in standard bit pattern form for interjection into the user data/TDM stream on line 180 from the demultiplexer 177. These signals pass from the signal generator 305 over line 172 to the overwrite transmitter 170 (as in FIG. 7) which operates to overwrite any change of state signals into the multiplex stream.

The call control signals from the message extractor 303 are passed to an outgoing message arbitrator function 307. This function 307 also receives, from the incoming signal processor 115 vial line 202, messages indicating errored frames received at the incoming signal processor 115, when such is the case.

The arbitrator 307 selects the appropriate one of these messages, depending on the preestablished priority, and forwards that message to the outgoing message memory 310. In any case, memory 310 ultimately receives all of the arbitrated messages and holds them on a first-in-first-out basis. Memory 310 is analagous to buffer 62 of FIG. 4.

Call control and other messages taken from the memory 310 are analyzed by a message director 312 which directs the message either to the matching address memory 206 (FIG. 9) or to a LAP-D frame protocol processor 314, depending on the ultimate destination. Forwarding a message to the matching address memory 206 changes that memory's contents and thus allows the validation addresses for received messages to be changed as was discussed above.

Call control messages are passed from the message director 312 to the LAP-D frame protocol processor 314 which functions to structure each message into Q.931 and Q.921 message and frame formats. These messages are passed to the overwrite/merge switch 168 which is controlled by a signal from the message director 312 (via line 316) to cause the signaling line 181 into the multiplexer 183 to acquire the message from the LAP-D frame protocol processor 314 rather than directly from the demultiplexer 177. The overwrite/merge switch functionality has been described above in connection with FIGS. 4 and 7.

Call control signaling originates not only at switching nodes as has been described herein but also at, or in connection with, the user devices between which communications are conducted via a network. The user devices operate in principle as has been described for a network node, and, in particular, with much the same functionality. Thus, what has been described above will be applicable to what follows with respect to a description of user equipment adapted to incorporate the invention.

Figure 11:
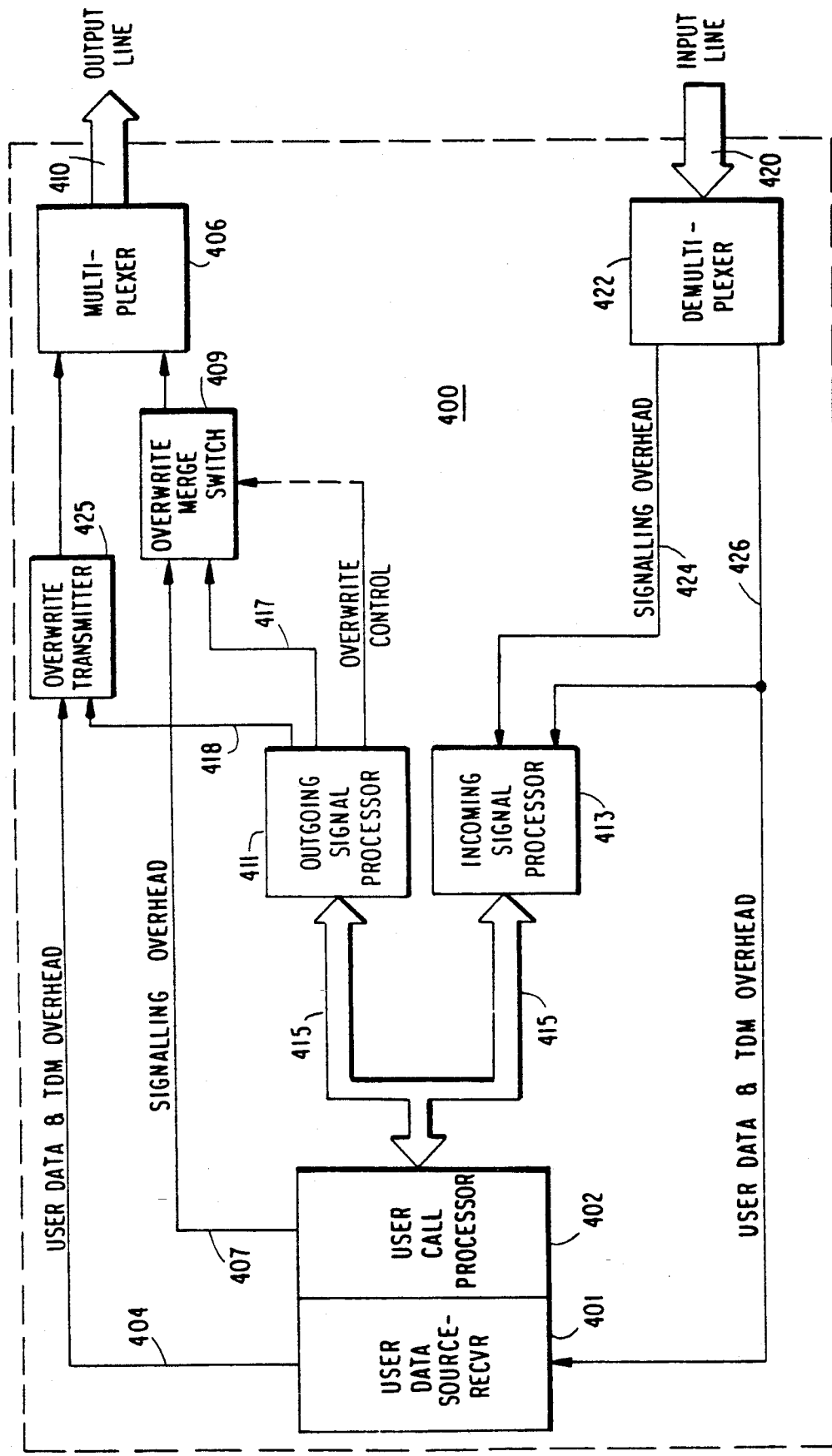
FIG. 11 is a schematic illustration of one form of user equipment applicable to the invention.

FIG. 11 exemplifies one form of user equipment 400 (such as the user devices of FIGS. 2, 3, and 6) adapted to format the overhead portion of a digital multiplex stream with call control signaling. In general, the user has a data transmitting and receiving device shown in FIG. 11 as user data source-receiver 401. The user data source-receiver 401 may, for example, include a digital computer (not expressly illustrated) with which it is desired to communicate (send and receive) digital data through the network (e.g., of FIG. 2). Associated with the user data source-receiver 401 is a user call processor 402 which is operative to generate and receive the particular signals required for call control.

On the transmit side, the user data source-receiver 401 puts out, on line 404, a digital data signal which passes to a multiplexer 406, via an optional overwrite transmitter or switch 425, as one multiplexer input. This digital data stream may, for example, be the user data/TDM portion of a DS1-ESF stream as has been described above.

To fully formulate the data stream to be transmitted, the user call processor 402 furnishes the signaling overhead data bits as an output on line 407. The signaling overhead stream on line 407 normally constitutes the FDL data, and in a particular case might provide the PRM messages as has been described. This FDL data passes, via the overwrite/merge switch 409 to the multiplexer 406 as a second input where the two input streams are then multiplexed together to produce the full multiplex stream as an output. The output stream appears on output line 410 by which it may be conveyed to a telecommunication network.

The user equipment 400 also includes an outgoing signal processor 411 and an incoming signal processor 413. These signal processors are entirely analagous and functionally equivalent to the incoming and outgoing signal processors, respectively, discussed above in connection with FIGS. 7-10.

Outgoing call control signals that are to be carried in the signaling overhead are produced (both as a response and as a command) by the user call processor 402. Those signals (preferably structured as messages as was described above with respect to FIG. 8) are put out on the LAN or control bus 415 and addressed to outgoing signal processor 411. The outgoing signal processor 411 then reformats the message to produce, for example, call control messages structured in accordance with the Q.921 and Q.931 standards. These messages then pass to the overwrite/merge switch 409 over line 417. The overwrite/merge switch 409, under coordinated control by the outgoing signal processor 411, effectively switches the second input line of the multiplexer 406 to take in the call control message. That message thus essentially overwrites, or merges with, whatever was in the signaling overhead coming directly from the user call processor 402. The result is that the call control message is multiplexed into the overall stream and within the signaling overhead portion.

Any change of state signals on the outgoing, or transmit, side are most generally produced directly by the user data source-receiver 401 and are contained in the data stream on line 404. Optionally, however, the outgoing signal processor 411 may generate these standard signals (such as AIS and Idle) and put them out on line 418 to overwrite transmitter 425 where there is an overwrite (an interjection) of the data bits for these signals.

On the input or receive side, a composite multiplexed data stream (e.g., DS1-ESF) containing the signal in the multiplex overhead is received on input line 420. That stream passes to demultiplexer 422 which separates out the signaling overhead on to line 424 by which it is passed to the incoming signal processor 413. The user data and the TDM overhead emerge from the demultiplexer 422 on line 426 by which they are conveyed directly to the user data source-receiver 401 for conventional handling. The user data/TDM stream is also taken into the incoming signal processor 413 for extracting and processing any change of state signals delivered to the user device 400. This is carried out as was described above in connection with processing at a switching node.

The arriving call control signals are also processed by the incoming signal processor 413 to remove the message from the Q.921 format and for reformatting for compatibility with LAN bus 415 and the user call processor 402. The call control message thus is sent to the user call processor 402, as a command or response, for handling as a received signaling message.

The embodiment of the invention which has been described utilizes components and functional elements well known to those of skill in the art. For example, the invention is shown to make use of standard processors, buffers, protocol processors, multiplexers, demultiplexers, and other such well known components. The interconnection and operative requirements of such components, including their power requirements, synchronization and timing demands, along with the general processing requirements of call control signaling, are all well known to those of skill in the art.

It will be appreciated also that, while the invention has been described for convenience mostly in terms of a DS1 environment, the principles of operation are fully useable at the higher data rates and broader bandwidths (e.g., of Table 1). In addition, it will be noted that the invention will find utility in portions of a telecommunications network, or for merely interfacing to a network, and need not be used end-to-end within a network to the exclusion of other call control signaling methods.

Further, it will be apparent that the functionality of the invention may be obtained in various ways and by various combinations of hardware and software. Thus, the description herein is of but one form of the invention, and it will be appreciated that various modifications may be made therein, and the invention embodied in other forms, without deviating from the spirit and scope of the invention. It is intended that the following claims shall cover all such modifications and embodiments.

What is claimed is:

1. A method for performing call control signaling with and within a telecommunications network, comprising the steps of:
   (a) formatting at least one multiplexed digital stream to be carried in at least a portion of the network so that it is comprised of a data bit stream and a multiplex overhead bit stream;
   (b) appropriating a portion of the multiplex overhead bit stream from other purposes and formatting said portion to convey call control signaling; and
   (c) processing said call control signaling at at least one node of the network to carry out at least a portion of the call control signaling between users of said network.

2. The method of claim 1 wherein the multiplex overhead bit stream includes a portion reserved as a bit stream for facilities data linking and said call control signaling is inserted into said facilities data linking stream.

3. The method of claim 2 wherein the step of processing said call control signaling is carried out at each node of the network that is used to establish an end-to-end connection path between users to said network.

4. The method of claim 2 wherein: the call control signaling contained within said facilities data link stream is in the form of addressed messages; the processing of step (c) includes the extraction of the facilities data link stream from said muliplexed stream; the message address of each message is checked for address vailidity; and each validly addressed message is processed as a call control response or command.

5. The method of claim 2 wherein additional signaling, not contained in the multiplex overhead bit stream, is contained in said data stream, and said additional signaling is processed at said node.

6. The method of claim 5 wherein said additional signaling comprises change of state signals.

7. For use in a communications system conveying calls between system users via multiplexed data streams, at least some of the streams being of the type having a multiplex overhead portion and a user data portion, a method to perform call control signaling between users, comprising the steps of:
   (a) formatting the multiplex overhead of a multiplexed data stream so that a portion of it is appropriated to include data identifiable as call control signaling;
   (b) in connection with call routing, extracting the call control signaling from said multiplexed data stream;
   (c) processing the extracted call control signaling to selectively generate new call control signaling; and
   (d) selectively interjecting the new call control signaling into the multiplex overhead of at least one of said multiplexed data streams; whereby call control signaling and user data portions of a multiplexed data stream are processed and directed separately although conveyed associatively in a multiplexed data stream.

8. The method of claim 7 wherein the multiplex overhead portion includes a data link stream appropriated in accordance with step (a).

9. The method of claim 7 wherein the call control signaling is extracted at a switching node of the system.

10. The method of claim 9 wherein step (a) is carried out in user equipment.

11. The method of claim 9 wherein the extracted call control signaling is processed by a processor shared among ports of the switching node.

12. A communications system wherein multiplexed data streams are sued to convey information between users and at least some of the streams are of the type having a multiplex overhead portion and a user data portion, such system comprising:
   (a) means for formatting the multiplex overhead of a multiplexed data stream so that at least a portion of said overhead is appropriated to include data identifiable as call control signaling and for transmitting said multiplexed data stream to a receiving unit within said system;
   (b) means located at said receiving unit for extracting the call control signaling from the multiplex overhead; and
   (c) means for processing the extracted call control signaling to selectively generate any required responsive call control signaling; whereby call control signaling is conveyed in-band within a multiplexed data stream.

13. The system of claim 12 further including:
   (d) means for selectively directing said responsive call control signaling to at least one of said multiplexed data streams; and
   (e) means for selectively interjecting the responsive call control signaling into the multiplex overhead of said at least one multiplexed data stream.

14. The system of claim 13 comprising a telecommunications network having at least one user device connected to at least one node thereof and wherein said one node and said user device each include elements (a) through (e) of claim 16.

15. The system of claim 14 wherein said node further includes a control processor for shared control of switching means located at said node and for processing the extracted call control signaling.

16. The system of claim 14 wherein said means for extracting the call control signaling comprises a demultiplexer for separating the multiplex overhead portion of said multiplex data stream from said user data portion, and a signal processor for receiving the separated multiplex overhead from said demultiplexer and for formatting the call control signaling in a message format suitable for processing by the means for processing the extracted call control signaling.

17. For use in a communications network conveying calls between users via multiplexed data streams, at least some of the streams having a multiplex overhead portion and a user data portion, a method to perform call control signaling, comprising the steps of:
(a) formatting the multiplex overhead of a multiplexed data stream so that at least a portion of it is appropriated from other purposes to include data identifiable as call control signaling;
(b) extracting the call control signaling from said multiplexed data stream at at least one node of the network; and
(c) processing the extracted call control signaling to selectively generate new call control signaling; whereby call control signaling and user data portions of a multiplexed data stream are conveyed associatively in a multiplexed data stream.

18. The method of claim 17 including the further steps of: (d) selectively directing said new call control signaling to at least one of said multiplexed data streams; and (e) selectively multiplexing the new call control signaling into the multiplex overhead of said at least one multiplexed data stream.

19. A communications system wherein multiplexed data streams are used to convey information between users and at least some of the streams have a multiplex overhead portion and a user data portion, such system comprising:
(a) means for formatting a portion of the multiplex overhead of a multiplexed data stream normally used for other purposes so that said overhead includes data identifiable as call control signaling;
(b) at least one node adapted to receive the multiplexed data stream and including,
(i) means for extracting the call control signaling from the multiplex overhead;
(ii) means for processing the extracted call control signaling to selectively generate new call control signaling;
(iii) means for selectively interjecting the new call control signaling into the multiplex overhead of at least one of said multiplexed data streams;
whereby call control signaling and user data portions of a multiplexed data stream are processed and directed separately and conveyed associatively in a multiplexed data stream.

20. A method for conveying call control signaling within a multiplexed digital data stream having a multiplex overhead bit stream which includes a facilities data link portion, comprising the steps of:
(a) producing call control signals in a digital message format to provide call control messages; and
(b) interjecting the call control messages into the facilities data link portion of said multiplexed data stream for in-band conveyance of said messages.

21. The method of claim 20 wherein the multiplexed data stream conveying said messages is transmitted within a telecommunications network and the call control messages are extracted from said multiplexed data stream and processed at at least one node of said network.

22. The method of claim 21 wherein call control messages are produced at a first suer device and at said one node for an exchange of call control signals between said first user device and said one node.

23. The method of claim 22 wherein said call control messages are produced at a second user device connected to the network and at a plurality of nodes of the network in an end-to-end connecting path through the network between said first and second users.

24. The method of claim 22 wherein said call control messages are produced at a second user device connected to the network and at each node of the network in an end-to-end connection path through the network between said first and second users.

* * * * *